Oct. 18, 1966

F. J. ARKELL ETAL  3,279,341

OPTICAL PRINTER AND DISPLAY SYSTEM

Filed June 29, 1964

INVENTORS
Frank J. Arkell, Kenneth W. Hines &
Evan L. Ragland.

By Mueller & Aichele

Attys.

FIG. 15

Inventors
Frank J. Arkell, Kenneth W. Hines &
Evan L. Ragland.
By
Mueller & Aichele
Attys.

3,279,341
OPTICAL PRINTER AND DISPLAY SYSTEM
Frank J. Arkell, Glenview, Kenneth W. Hines, Oak Park, and Evan L. Ragland, Glenview, Ill., assignors to Motorola, Inc., Chicago, Ill., a corporation of Illinois
Filed June 29, 1964, Ser. No. 378,685
12 Claims. (Cl. 95—4.5)

This invention relates to an electro-optical system for directing a light beam to a predetermined position and in particular to a data printer using electro-optical positioning techniques.

Communication channels and data processing systems have historically utilized mechanical printers operating at rates of about 100 words per minute for data read out. This rate is 10 to 100 times slower than the output rate of operationally practical communications and data processing systems, hence these systems tend to become print out limited.

Many efforts have been made to increase mechanical print rates, however, severe limitations are encountered in accelerating and decelerating mechanical systems. This has forced designed compromises which result in equipment complexity, such as matrix print heads, extensive data storage, and elaborate timing and control functions. Highly precise adjustments and frequent maintenance have also been characteristic of these designs and the resulting printers have not been reliable.

Electrographic printers offer improvements in performance, reliability and ease of maintenance over conventional printers, and are simpler than pure mechanical printing machines. However, the electrographic printers require extensive electronics, and frequently require complex inter-face equipment for their application.

The use of optical systems in a data printer, to form and position the characters to be printed, has been limited by the complex mechanical positioning systems required. These mechano-optical systems are also limited in their speed of operation by the same mechanical limitations of electro-mechanical printers. Electro-optical printers have not been able to provide sufficient resolution and have been subject to positional switching transients which limit their usefulness. In addition a simple means for shaping the light beam in the form of a desired character has not been available.

It is therefore an object of this invention to provide an improved data printer having a high print rate and having a minimum number of mechanical parts.

Another object of this invention is to provide a data printer which requires a minimum amount of inter-face equipment.

A further object of this invention is to provide a data printer having no data buffering or storage requirements.

Another object of this invention is to provide a data printer of rugged and compact design suitable for use under severe environmental conditions.

Another object of this invention is to provide an improved system of positioning a light beam by electro-optical techniques.

A further object of this invention is to provide an electro-optical switching system substantially free of positional switching transients.

Another object of this invention is to provide an electro-optical system for shaping a light beam to form a desired character.

A feature of this invention is the provision of a data printer with a solid state character generation and positioning system.

Another feature of this invention is the provision of a data printer using electro-optical switches to direct light beams to desired positions.

A further feature of this invention is the provision of a data printer with an electro-optical switching system using a combination of binary and sequential switches to minimize positional switching transients in positioning a light beam.

Another feature of this invention is the provision of a data printer using electro-optical switches to direct a light beam through a particular transparent portion of a character mask thus shaping the light beam in the desired form.

Still another feature of this invention is the provision of a data printer with an electro-optical system for directing a shaped light beam to a particular position on a photo-sensitive medium for reproducing a desired character thereon.

Another feature of this invention is the provision of a data printer with an input circuit for translating sequentially transmitted data information to a parallel system.

In practicing this invention a data printer is provided using electro-optical techniques for shaping a light beam and directing the shaped light beam to a desired position on photo-sensitive medium. Input data is processed in an electronic circuit which provides the proper switching voltages for directing the light beam to the desired position and for shaping the light beam in the form of the desired character.

A light source provides a collimated beam of plane polarized light which is directed by a series of binary switching elements to a particular transparent portion of a character mask. The transparent portion of the character mask shapes the light beam in the form of the desired character. A second series of binary switches directs the shaped beam of light to a predetermined exit position. A series of binary and sequential optical switching elements then directs the shaped light beam to the desired position on the photo-sensitive medium. The binary light switches are operated first so that they reach a steady state switching position before the sequential switches are operated. By using a combination of binary and sequential switches, which are operated in a timed sequence, positional transients are essentially eliminated. The shaped beam of light striking the photo-sensitive medium prints a character thereon.

The only mechanical movement involved is a line feed mechanism which positions the photo-sensitive medium to receive each line of data. The shaping of the light beam in the desired form and the positioning of the light beam is accomplished by electro-optic switching. The printer may also have features such as back spacing, tabulation, line feed and carriage return.

Figures 1, 2, 3, 4, 5:
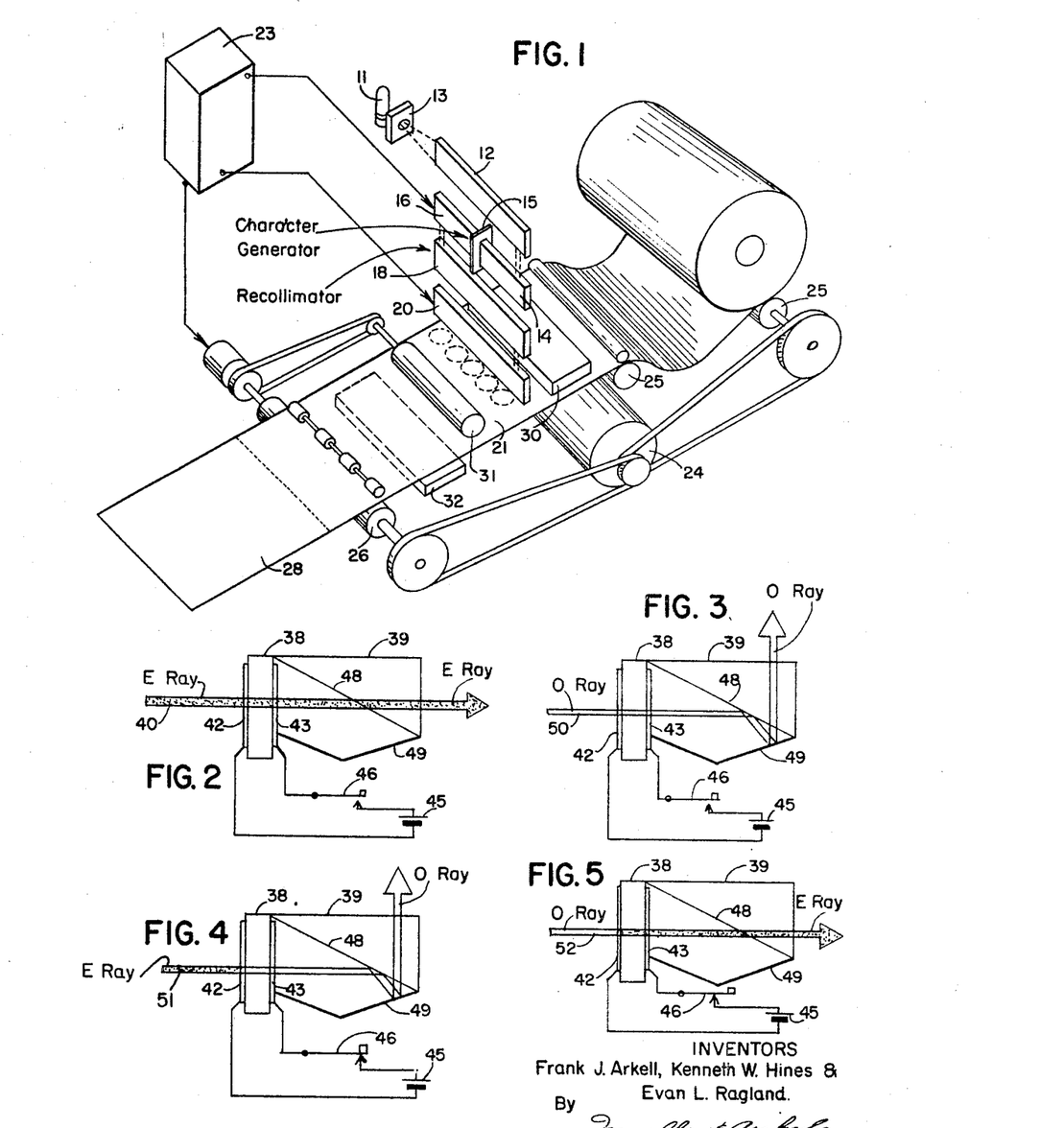
FIG. 1 is a perspective view of a printer incorporating the features of this invention.
FIGS. 2, 3, 4 and 5 illustrate the operation of a sequential light switch.

FIG. 1 is a schematic view showing the operation of the optical printer. A light source 11 produces a light beam which is plane polarized in polarizer 13. The polarized beam of light is collimated in collimator 12 and directed through a series of binary switches 14 which cause the beam to pass through the desired position in character mask 15. Character mask 15 contains a large number of transparent portions in the shape of characters which are to be printed or displayed such as letters, numerals and punctuation marks. Upon passing through the character mask the polarized beam is shaped in the form of the desired character and is directed through a second series of binary switches 16 to a predetermined exit path. The shaped light beam is directed through recollimator 18 to a character positioner which directs the shaped light beam to the desired line position on the photo-sensitive medium 21.

The photo-sensitive medium 21 is carried by rollers 25 and 26 operated by motor 24. The photo-sensitive medium 21 can be cut into page size sheets 28 after the characters have been imprinted thereon. An electronic unit 23 provides the necessary control signals for operating the optical switching elements and the mechanical transport of the photo-sensitive medium.

The photo-sensitive medium used with this printer can be any medium which will provide a fixed image on exposure to light, such as photofilm or a photo-conductive paper. In addition, with the availability of high intensity light sources such as lasers, an image may be burned into the paper directly.

In the printer described herein a photo-conductive paper is used. This paper is charged at charge station 30 before the shaped light beam strikes the paper. The effect of the light beam is to discharge the paper wherever the beam strikes the paper. The charge image on the paper is developed by the application of a toner at developing station 31. This toner is fixed by heat applied at fix station 32.

*Electro-optic sequential light switch*

FIGS. 2, 3, 4 and 5 illustrate the principle of operation of an electro-optic sequential light switch. The sequential light switch is composed of an electro-optic crystal 38 and a prism 39 positioned so that a light beam 40 will pass through electro-optic crystal 38 before passing through prism 39. Electro-optic crystal 38 is a crystal of the type which will cause rotation of the plane of polarization of plane polarized light passing therethrough when an electric field of predetermined magnitude is applied thereacross. Examples of such crystals are Pockel's crystals and Kerr cells. Prism 39 is a prism which is adapted to receive E and O rays and wherein one of said rays is reflected and the other of said rays is transmitted. Examples of prisms of this type are Foster prisms and Nichol prisms.

Electrodes 42 and 43 are positioned on opposite faces of crystal 38. Electrodes 42 and 43 are coupled to battery 45 through switch 46. When switch 46 is closed, a voltage is applied across electrodes 42 and 43 creating an electric field within crystal 38. When the electric field is a predetermined magnitude, the plane of polarization of plane polarized light passing through crystal 38 is rotated 90 degrees.

In an example of the sequential light switch shown in FIGS. 2, 3, 4 and 5, electro-optic crystal 38 is a Pockel's crystal and prism 39 is a Foster prism. As illustrated in FIG. 2, an E ray passing through Foster prism 39 will be transmitted without reflection and will leave the prism at the face opposite from that through which it entered the prism. As illustrated in FIG. 3, an O ray 50 passing through Foster prism 39 will be reflected at the interface 48 between the two crystals forming the prism and from silvered face 49. Thus the O ray 50 will emerge from prism 39 at right angles to the path along which the O ray entered the prism.

In both FIGS. 2 and 3, switch 46 is open and thus no electric field is applied across Pockel's crystal 38.

In FIG. 4 switch 46 is closed and an electric field is developed across crystal 38. The electric field applied across crystal 38 causes the plane of polarization of the E ray 51 entering crystal 38 to be rotated through an angle of 90 degrees and thus ray 51 becomes polarized as an O ray. The O ray 51 entering Foster prism 39 is internally reflected and emerges at right angles to its entrance path.

In FIG. 5 switch 46 is also closed thus developing an electric field across Pockel's crystal 38. The O ray 52 entering Pockel's crystal 38 is rotated 90 degrees to become an E ray, which is transmitted through Foster prism 39 without internal reflection. It is thus possible to switch a ray of plane polarized light to one of two paths by controlling an electric field applied to an element of the sequential light switch.

*Binary optical switch*

A binary optical switch is illustrated in FIGS. 6, 7, 8 and 9. An electro-optic crystal 57 similar to the electro-optic crystal 38 of FIG. 2, is combined with a birefringent crystal 58. Birefringent crystal 58 may be uniaxially birefringent or biaxially birefringent and in this example is uniaxially birefringent. Crystal 57 has electrodes 62 and 63 positioned on opposite faces and coupled to battery 64 through switch 66. As a consequence of the optical anisotropy of birefringent crystal 58, a light ray polarized as an E ray passing through crystal 58 is refracted at the crystal face 60 while a light ray polarized as an O ray is not refracted. Since refraction also occurs at the second surface of crystal 58 the E ray emerges from the crystal parallel to the path of the incident E ray but displaced by a distance ($d$) from that path. The magnitude of ($d$) is a function of the angle of refraction and the thickness ($t$) of the birefringent crystal.

Figures 6, 7, 8, 9, 10:
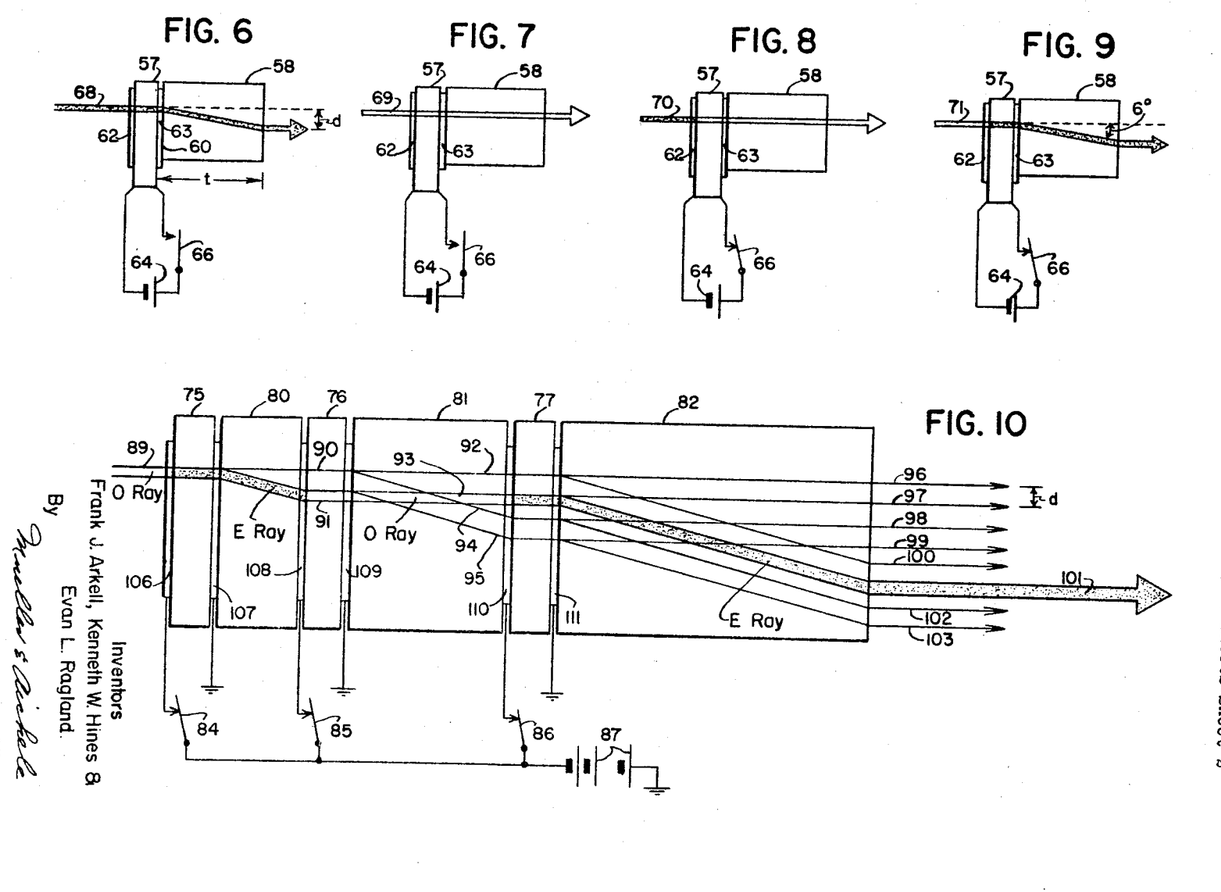
FIGS. 6, 7, 8 and 9 illustrate the operation of a binary light switch.
FIG. 10 illustrates the operation of a multi-element binary switch.

In FIG. 6 an E ray 68 passing through the birefringent crystal 58 is displaced through a distance ($d$) determined by the thickness ($t$) of crystal 58. In FIG. 7 an O ray 69 passing through birefringent crystal 58 emerges without displacement. In FIGS. 8 and 9 switch 66 is closed and an electric field is applied across Pockel's crystal 57. Thus a ray of light plane polarized in a particular direction and passing through the Pockel's crystal 57 will have its plane of polarization rotated 90 degrees. In FIG. 8 an E ray 70 passing through Pockel's crystal 57 is rotated to become an O ray which is not displaced. In FIG. 9, an O ray 71 is rotated by Pockel's crystal 57 to become an E ray, which is displaced in passing through birefringent crystal 58.

A binary switch incorporating three of the elements illustrated in FIGS. 6 through 9 is shown in FIG. 10. The binary switch consists of birefringent crystals 80, 81 and 82, and Pockel's crystals 75, 76 and 77 placed before each of the birefringent crystals.

The thickness T of each of the birefringent crystals, of the binary switch is related to thickness of the other birefringent crystals by the following formula;

$$T = K(2)^n \qquad (1)$$

where K is an arbitrary constant dependent on the desired shift in position of the light ray, $n$ is an integer having the values from 0 to $b-1$, where $b$ is the number of birefringent crystals. In this example the thickness of crystal 81 is twice that of crystal 80 and the thickness of crystal 82 is twice that of crystal 81 and four times that of crystal 80.

Electrodes 106, 107, 108, 109, 110 and 111 are placed on opposite faces of each of the Pockel's crystals 75, 76 and 77. Conductors 106 through 111 provide means for establishing an electric field across the Pockel's crystals. The conductors 106 through 111 are connected to a source of potential 87 through switches 84, 85 and 86. When switches 84, 85 and 86 are closed an electric field is applied to the Pockel's crystal with which the switches are associated causing the plane of polarization of a light beam passing therethrough to be rotated 90 degrees as previously described.

In a binary switch of this type, a plane polarized light beam entering the binary switch can be displaced to any one of $(2)^n$ positions where $n$ is equal to the number of birefringent crystals in the switch. In this example $n=3$ and thus the light beam entering along path 89 can be directed to any one of the eight positions 96 through 103. A light beam entering along path 89 is refracted to path 91 in birefringent crystal 25 if it is an E ray, and to path 90 if it is an O ray. In birefringent crystal 81, O rays entering along paths 90 and 91 are transmitted to paths 92 and 93 respectively while E rays entering along paths 90 and 91 are refracted to paths 94 and 95 respectively. Thus upon emerging from birefringent crystal 81 the ray may occupy any one of four positions, 92 through 95. O rays entering along paths 92, 93, 94 and 95 are transmitted to paths 96, 97, 98 and 99 respectively, while E rays entering along paths 92, 93, 94 and 95 are refracted to paths 100, 101, 102 and 103 respectively. By making each birefringent crystal of the series twice the thickness of birefringent crystal preceding it, the distance ($d$) between each possible output path can be made constant. While the birefringent crystals are arranged in order of increasing thickness, this order is not important and they can be arranged in any order of thickness which is desirable as long as the thickness of the crystals meets the criteria of Equation 1.

An example of the switching action of the three element binary switch upon an O ray when all three Pockel's crystals 75, 76 and 77 are energized, is illustrated in FIG. 10. A light beam polarized as an O ray enters the binary switch along path 89. Pockel's crystal 75 causes the O ray to be rotated 90 degrees to become an E ray which is refracted by birefringent crystal 80. The refraction occurring in birefringent crystal 80 displaces the E rays to path 91. The E ray leaving birefringent crystal 80, passes through Pockel's crystal 76 which is energized causing the plane of polarization of the E ray to be rotated 90 degrees to become an O ray again. The O ray is transmitted through birefringent crystal 81 without refraction and emerges from birefringent crystal 81 along path 93. The O ray leaving birefringent crystal 81 passes through energized Pockel's crystal 77, and is again rotated to became an E ray. The E ray is refracted in birefringent crystal 82 and directed to path 101. It is along path 101 that the E ray emerges from the binary switch. If it is desired to control the plane of polarization of the emergent ray, a Pockel's crystal could be placed at the output of the binary switch to rotate the plane of polarization to the desired plane.

*Combination of sequential and binary optical switches*

A sequential optical switch has the advantages that (1) boundary diffraction and reflection losses are negligible, (2) selection requires only one optical switching operation, and (3) rotation of the plane of polarization is not critical since the extraordinary component is shunted from the system. As will be subsequently explained, this last advantage is of great importance in eliminating the effects of the switching transient upon the light positioning system. The sequential switch, however, requires one control element for each element of resolution.

The binary light switch has the advantages that $(2)^n$ resolution elements can be controlled by $n$ inputs and the deflector can provide either one or two dimensional displacement. However, the binary light deflector will leak light to unselected positions unless the vector of polarization is accurately rotated 90 degrees.

Figure 11:
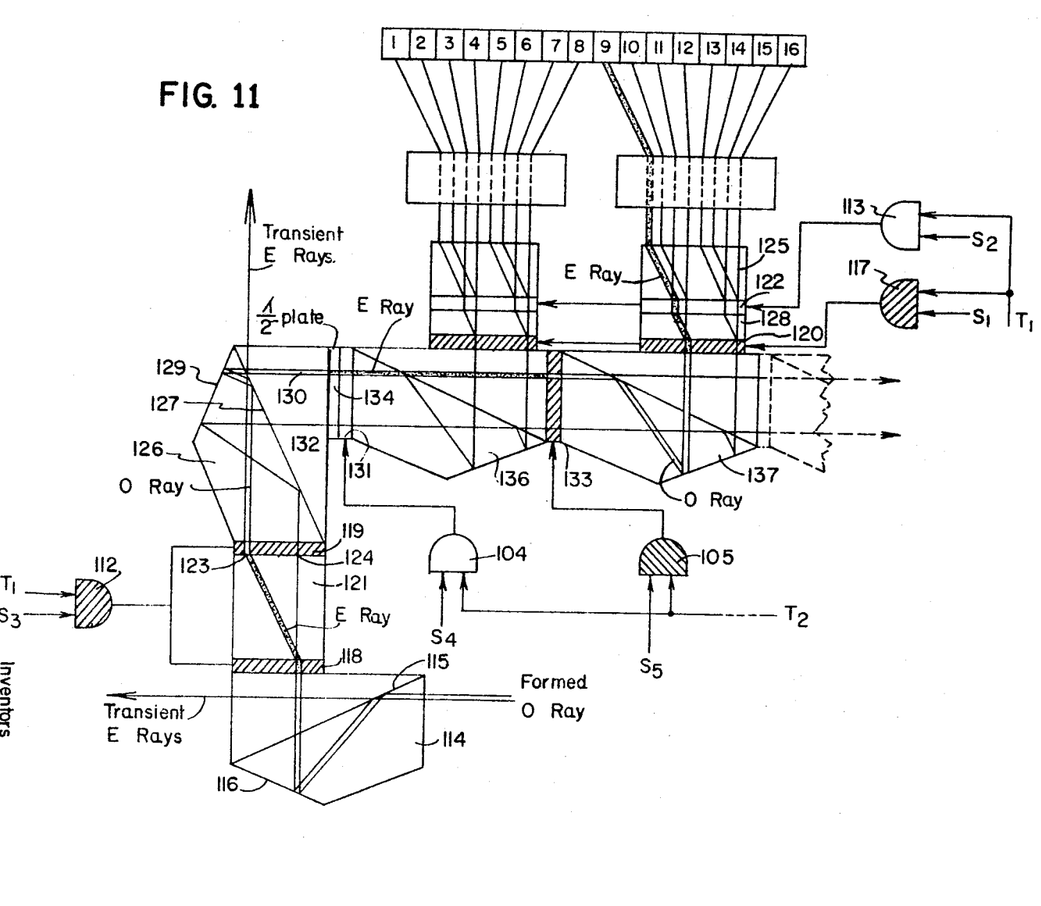
FIG. 11 illustrates the operation of a combination of binary and sequential light switches for positioning a light beam.

A system for positioning a light beam in any one of 16 separate positions is shown in FIG. 11. This system combines the advantages of the binary switch and the sequential switch and eliminates the effects of transients caused by the switching voltages applied to the Pockel's crystal.

A light beam polarized as an O ray enters Foster prism 114 and is reflected at the inter-faces 115 and 116 and emerges at right angles to the patch of entrance. The emergent ray passes through the binary switch formed by Pockel's crystals 118 and 119 and birefringent crystal 121. Any rays polarized in the E plane which enter prism 114 are transmitted through the prism and thus leave the optical system.

Pockel's crystal 118 and birefringent crystal 121 form a binary switch which directs the entering light beam along one of two paths 123 and 124, depending upon whether or not an electric field is applied across Pockel's crystal 118. In the example shown, an electric field is applied across Pockel's crystal 118 and the entrant O ray is rotated to become an E ray. The ray is refracted by birefringent crystal 121 and therefore emerges from birefringent crystal 121 along path 123. An electric field is also applied across Pockel's crystal 119 causing the emerging E ray to be rotated to become an O ray. Pockel's crystals 118 and 119 are coupled together and energized from AND gate 112. Thus the entrant ray and the emergent ray from binary switch 121 is always an O ray.

The O ray passes through Foster prism 126 and is reflected at inter-face 127 and silvered face 129 to emerge at right angles to the entrance path. Upon emerging from Foster prism 126 the light passes through the half-wave plate 134 and the series of sequential switches 136, 137 and any subsequent sequential switches which may be in the series. It can be seen that the O ray emerging from Foster prism 126 will travel along path 130 or 132 depending upon the energization of Pockel's crystals 118 and 119. Again any E rays present in the light beam passing through Foster prism 126 are not reflected and are transmitted through the prism and leave the optical system.

The O rays emerging from Foster prism 126 pass through half-wave plate 134 which transforms the O rays into E rays. The E rays will be transmitted directly through the series of sequential switches formed by Foster prisms 136 and 137 and Pockel's crystals 131 and 133 without being reflected. In order to position the light in a particular position it is necessary to energize the sequential switch associated with that position. In FIG. 11 Pockel's crystal 133 is energized thus the light beam entering Foster prism 137 is reflected in the prism and is directed to one of the positions 9 through 16. Since the light beam has already been displaced by birefringent crystal 121 it will be directed to one of the positions 9 through 12.

The exact position to which the light beam is deflected is determined by the binary switches composed of birefringent crystals 125 and 128 and Pockel's crystals 122 and 120. In this system Pockel's crystal 120 is energized causing the O ray emerging from Foster prism 137 to be rotated to become an E ray which is deflected by birefringent crystal 128. Birefringent crystal 128 has a thickness one-fourth of that of birefringent crystal 121 and one-half that of birefringent crystal 125 and thus the deflection in birefringent crystal 128 is one-fourth that of birefringent crystal 121 and one-half that of birefringent crystal 125. Pockel's crystal 122 is not energized and thus the plane of polarization of the light beam is not changed and it continues as an E ray which is again deflected in birefringent crystal 125 to position 9. As explained in the description of FIG. 10, by energizing proper combinations of Pockel's crystals 122 and 120 any one of four positions, in this example positions 9 through 12, can be selected.

In this example, the binary switches formed by birefringent crystals 121, 128 and 125 are energized by AND gates 112, 117 and 113, while the sequential switches formed by Foster prisms 136 and 137 have their Pockel's crystals energized by AND gates 104 and 105. AND gates 112, 113 and 117 have enabling pulses T1 applied thereto to turn on the AND gates, while AND gates 104 and 105 have enabling pulses T2 applied thereto to turn on the AND gates. In operating the optical positioning system, AND gates 112, 113 and 117 are energized before AND gates 104 and 105 by applying pulse T1 to the AND gates before pulse T2 is applied. During the transient period after pulse T1 is applied to the Pockel's crystals, the light beam passing through the Pockel's crystal has both E and O ray polarizations in combination. Pulse T2 is delayed until the transients resulting from pulse T1 have ceased. Pulse T2 switches only sequential switches which do not reflect E rays. Because of the operation of the Foster prisms, only O rays can enter the optical system formed by binary switches 125 and 128.

Thus the transients generated by the Pockel's crystals switched by the T2 pulse are only intensity transients and not positioning transients. The light sensitive printing medium, therefore, receives only the desired character at the desired position.

*Character generator*

Figure 12:
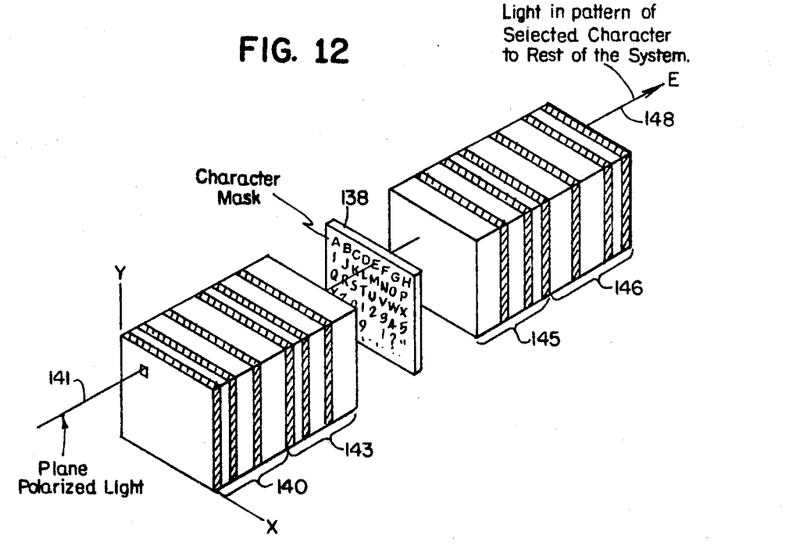
FIGS. 12 and 13 illustrate the operation of the character generator.

The switching elements for selecting the shape of the light beam are shown in FIG. 12. The character selection system consists of a series of binary light switching groups 140, 143, 145 and 146 which direct the light beam to a desired portion of character mask 138. Each binary light switching group is a three-element switch similar to that shown in FIG. 10, thus any one of sixty-four characters can be selected.

The light beam enters at point 141 and passes through the first binary light switching group 140. Binary light switching group 140 consists of 3 elements, and thus the light beam can be directed to any one of eight positions. Switching group 140 positions the light beam along the Y axis. A second binary switching group 143, having the optical axis of the birefringent crystals rotated 90 degrees with respect to the first binary light switching group 140, follows binary switching group 140. The light beam emerging from switching group 143 can also be positioned in any one of eight different positions. Since the optical axis of switching group 143 has been rotated 90 degrees with respect to the axis of switching group 140, the direction of displacement for switching group 143 is along the X axis. The light beam can be positioned in both the X and Y directions, and therefore the light beam can be directed to any one of 64 positions on character mask 138.

Character mask 138 consists of an opaque mask having transparent portions thereon. The light beam passing through character mask 138 assumes the shape of the transparent portion of the mask through which it passes. Since the binary switching arrangement can select any one of 64 positions on the mask, the mask can contain up to 64 characters. These can be numbers, letters, punctuation marks, or any character which may be desired.

In order that the subsequent portions of the optical system can direct the shaped light beam to the proper position upon the photo-sensitive medium it is necessary that the beam enter the positioning portion of the printer along the same path for each character. Since the beam can be positioned to any one of the 64 positions on character mask 138, it is necessary that the shaped light beam leaving the character mask be directed along a predetermined path. This is accomplished by binary light switching groups 145 and 146, which are the same as binary switching groups 140 and 143 respectively. By coupling the corresponding Pockel's crystals of the two groups together, as shown in FIG. 13, the light beam will be directed to an output path 148 which is independent of the character selected.

Figure 13:
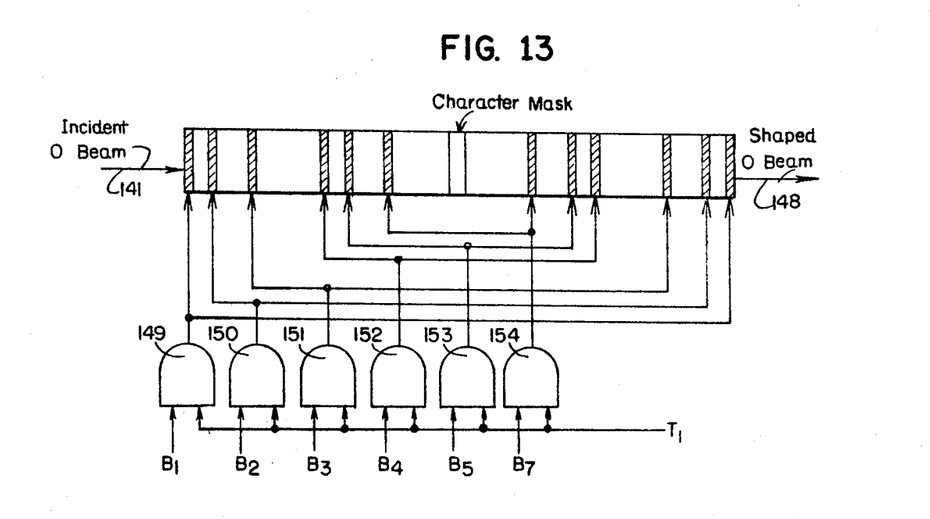

In FIG. 13 AND gates 149 through 154 control the elements of the binary light switching groups. Each AND gate controls two switch elements so that the shaped light beam will exit along path 148 irrespective of the character selected. The AND gates 149 through 154 are also energized by pulse T1 so that switching transients will not affect the character selected.

Figure 14:
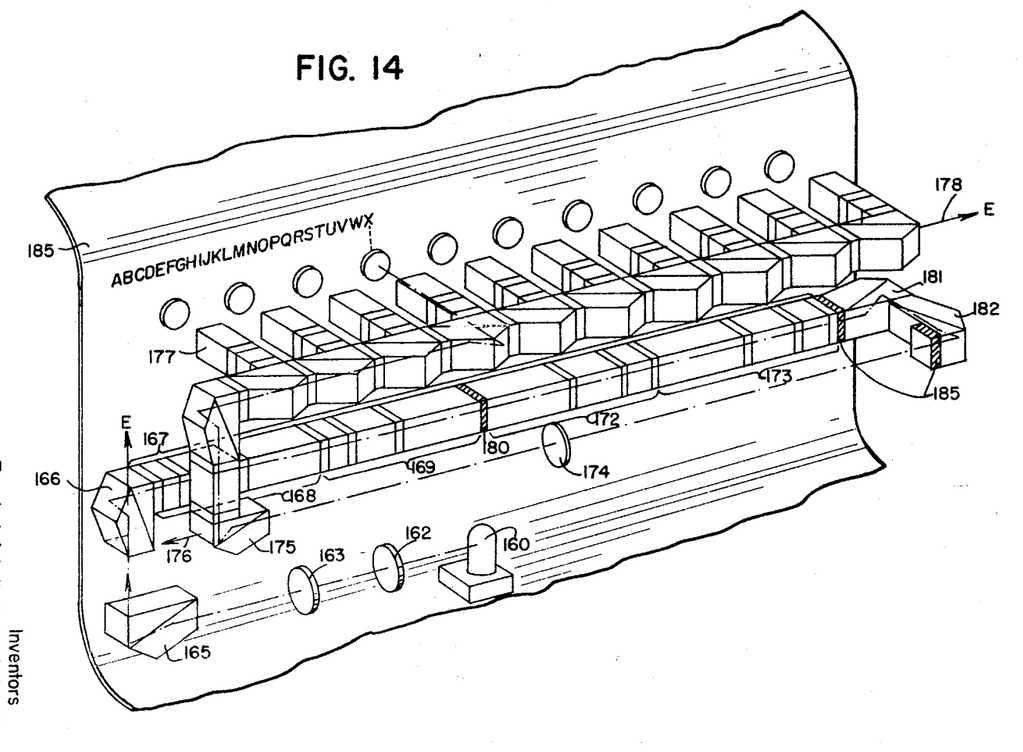
FIG. 14 is a perspective view of an optical system used in a printer.

The optical system for the printer of FIG. 1, including the components previously described, and used for generating characters and positioning the characters on the photo-sensitive medium is shown in FIG. 14. A beam of light from source 160 passes through polarizer 162 where it is plane polarized. The plane polarized beam of light is collimated in collimator 163 and directed to the character generation system through prisms 165 and 166. The character generation system 167 consists of 4 sets of binary switches 168, 169, 172 and 173, and a character mask 180 which operates as previously described. The shaped beam of light emerges from the character generation system and is directed by Foster prisms 181 and 182 to recollimator 174. Half-wave plates 185 may be positioned at various points in the optical system to compensate for rotation of the plane of polarization caused by spatial rotation of the Foster prisms.

The light beam after recollimation is directed by Foster prism 175 into the optical positioning system. Foster prism 175 of FIG. 14 is the same prism as prism 114 of FIG. 11. The positioning system consists of 10 sets of sequential light switches each followed by a two element binary switch positioned in a line opposite the photo-sensitive medium 185. Each sequential switch and binary switch combination is capable of directing the light beam to one of eight positions on the photo-sensitive medium as described in FIG. 11. Thus the light beam entering the positioning system can be directed to any one of 80 positions in a line on the photo-sensitive medium.

In the optical system shown in FIG. 14 a light can be shaped in the form of any one of 64 characters and positioned at any one of 80 positions on the photo-sensitive medium 185. The character selection and switching is accomplished by electro-optical switching and no mechanical motion is required.

DESCRIPTION OF LOGIC USED IN THE OPITICAL PRINTER

*Data input*

Figure 15:
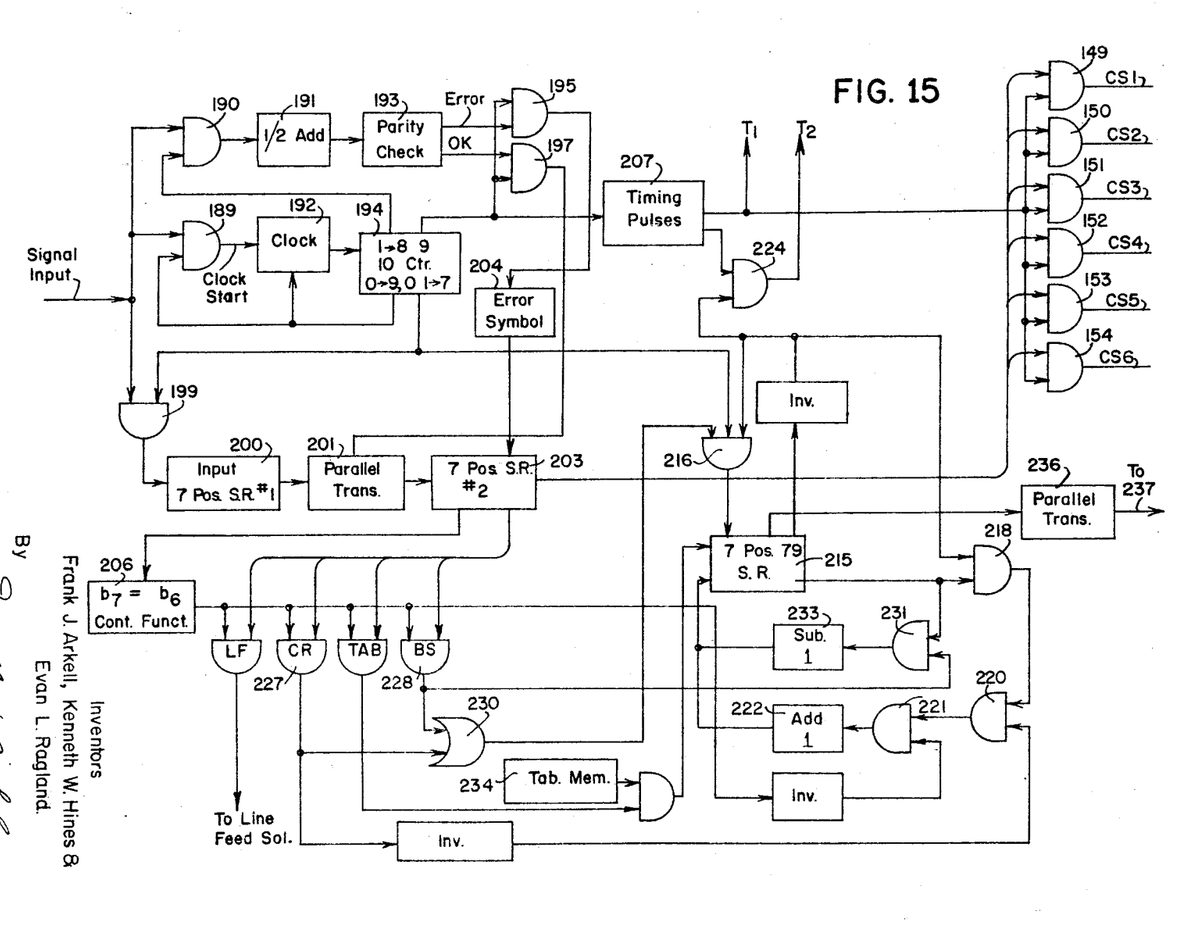
FIGS. 15 and 16 are logic diagrams illustrating the operation of the optical printer control and switching system.

A block diagram of a logic system for receiving data and operating the printer as a result of the received data is shown in FIG. 15. Any form of coded input can be used with this printer. As an example, a system for receiving and utilizing the ASAX3.2 code is described. This code consists of ten pulses for each character, with the pulses umbered $B_0$ through $B_9$. Pulse $B_0$ is the start pulse, pulse $B_9$ is the stop pulse, pulse $B_8$ is the parity check pulse and pulses $B_1$ through $B_7$ determine the character to be selected. With this code, 64 separate characters can be selected. Sixty-four characters require only a six bit binary number so that the seventh bit provides a means of indicating a control function. If bit $B_7$ equals bit $B_0$, a control function and not a character will be selected.

The start pulse is coupled through AND gate 189 to clock 192. Clock 192 provides 10 counting pulses for ten counter 194. When ten counter 194 has counted from zero through nine, a stop pulse is applied to clock 192 and an enabling pulse is applied to AND gate 189. Thus, if ten counter 194 is not in count zero, a start pulse will not start clock 192.

Clock pulses 1 through 8 are applied from ten counter 194 to AND gate 190 enabling this AND gate. The eight input pulses received during the time that AND gate 190 is enabled are added in half adder 191 and applied to parity check 193. Partity check 193 produces an error signal and applies it to AND gate 195 if the parity check is not correct and produces a signal which is applied to AND gate 197 if the parity check is correct. Ten counter 194 couples clock pulses 1 through 7 to AND gate 199 enabling this AND gate so that the pulses representing the character are received by input shift register 200. If the parity check is correct, the binary number stored in shift register 200 is coupled to shift register 203 through the parallel transfer 201 at count 9. If the parity check produces an error, an error symbol from error symbol generator 204 is coupled to shift register 203 and stored therein. If bit number 7 equals bit number 6 the control function signal is recognized in control function decoder 206. The result of this signal will be discussed subsequently.

During count 9, a pulse is coupled from ten counter 194 to counting pulse generator 207 producing pulses T1 and T2. Pulse T1 times the selection of the character and the partial positioning of the character. Pulse T2 determines the final position of the character and can be considered the printing pulse, since this directs the light beam to the printing medium causing the shaped light beam to be registered thereon. Pulse T1 turns on before pulse T2 and turns off after pulse T2. This eliminates the effect of switching transients on the light beam as previously described.

*Character selection*

Six of the seven bits stored in shift register 203 are coupled to AND gates 149 through 154 to enable particular ones of these AND gates, dependent upon the character, to be selected. These AND gates are the same as AND gates 149 through 154 of FIG. 13. Timing pulse T1 also provides an enabling pulse to each of the AND gates 149 through 154. Thus during the duration of pulse T1, the selected AND gates produce switching signals which are coupled to the proper character selection switches to direct the light beam through the proper character mask, thus shaping the light beam. The character corresponding to the number contained in shift register 203 is selected even if a control function has been indicated and no character is to be printed. As will be discussed subsequently, when a control function is selected the number is not printed.

*Character positioning*

Figures 16, 17:
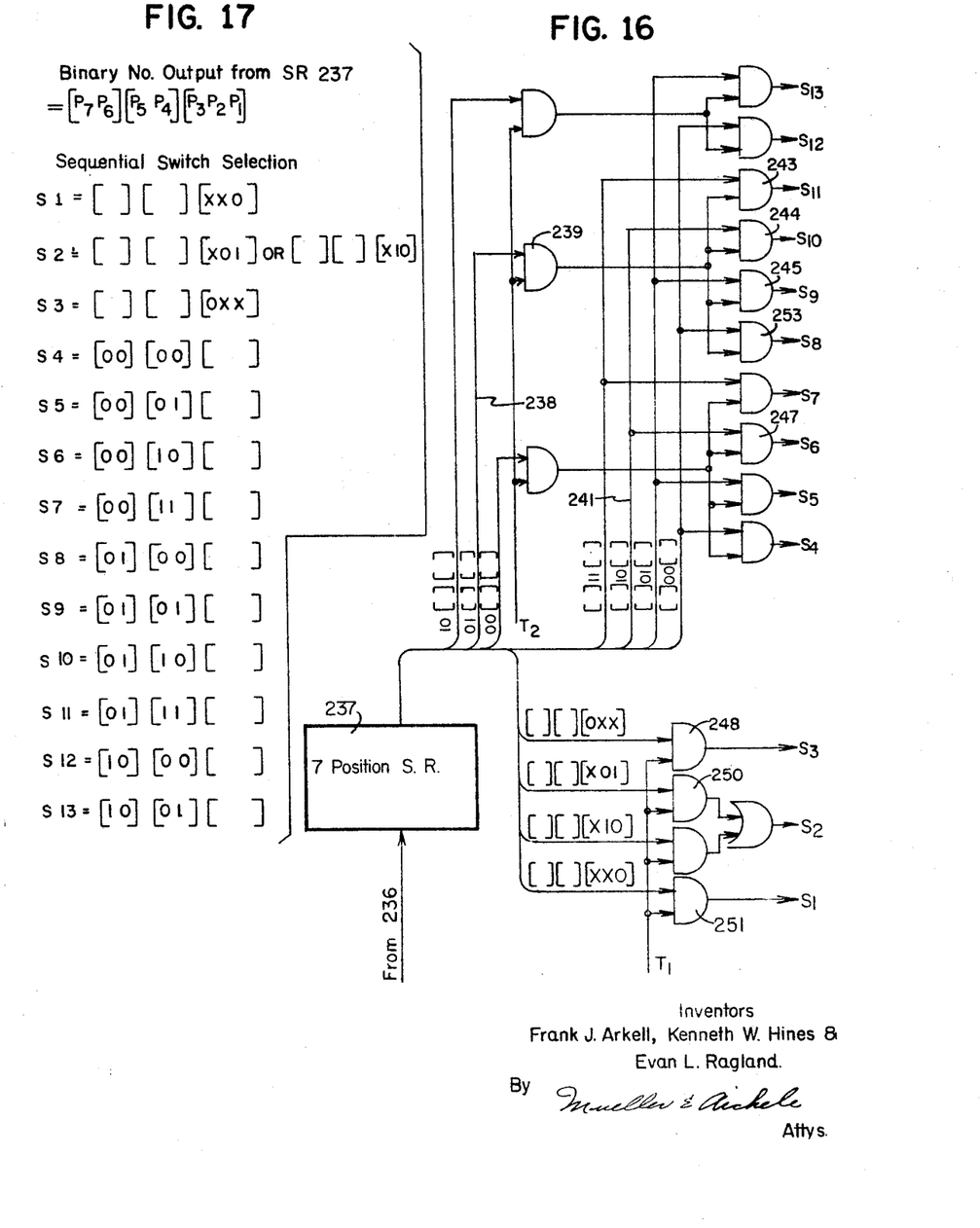
FIG. 17 is a table illustrating the relationship between the data position code and the switches operated thereby.

Referring to FIG. 16, a shift register 237 contains a seven bit binary number which determines the line position to which the character is to be directed. In this example there are 80 positions available. Thus shift register 237 will contain counts from zero to 79. For purposes of obtaining efficiency in the circuit design the binary number in shift register 237 has been divided into three portions. The most significant bits $P_7$ and $P_6$ form the first portion, bits $P_5$ and $P_4$ form the second portion, and the least significant bits $P_3$, $P_2$ and $P_1$ form the third portion. The output binary number from shift register 237 is used to select various combinations of 13 switches numbered $S_1$ through $S_{13}$. Switches $S_4$ through $S_{13}$ operate the sequential light switches and they are mutually exclusive, that is, only one switch can be actuated at a time. Switches $S_4$ through $S_{13}$ are selected by the four most significant bits of the binary output of shift register 237, that is, the first and second portions of the binary number. Switches $S_1$ through $S_3$ control binary light switches and are not mutually exclusive, that is, various combinations of these switches can be actuated a the same time.

FIG. 17 is a table showing the binary numbers which actuate the various switches. It can be seen that binary switch controlled by $S_1$ is actuated whenever the least significant bit $P_1$ is a 0. Switch $S_2$ is actuated whenever the 2 least significant bits $P_2$ and $P_1$ are 01 or 10. $S_3$ is actuated whenever the third least significant bit $P_3$ is 0. Thus if the three least significant bits $P_3$, $P_2$ and $P_1$ read 010, switches $S_1$, $S_2$ and $S_3$ would all be actuated.

Groups of switches are selected by the fourth and fifth bits $P_4$ and $P_5$. Thus if these bits are 00, switches $S_4$, $S_8$ and $S_{12}$ will be selected. The most significant bits $P_6$ and $P_7$ also select groups of switches. If $P_6$ and $P_7$ read 00, $S_4$, $S_5$, $S_6$ and $S_7$ are selected. Thus, if the number contained in the second portion of the binary number, from shift register 237 is 00, switches $S_4$, $S_8$ and $S_{12}$ are selected and if the number in the first portion is 00, switch $S_4$, $S_5$, $S_6$ and $S_7$ are selected. Since $S_4$ is the only switch common to both groups, it will be the only switch selected for final operation. This operation will be further explained in the description accompanying FIG. 16 which follows.

Referring to FIG. 16 assume the number contained in shift register 237 is the binary number 0110010. Considering the bits $P_4$ and $P_5$ first, it can be seen that bits 10 select line 241 and provide enabling pulses for AND gates 247 and 244. The bits $P_6$ and $P_7$ select line 238 and provide an enabling pulse for AND gate 239. When timing pulse T2 is applied to AND gate 239, the output pulse from this AND gate is applied to AND gates 243, 244, 245 and 253. Thus, AND gate 244 is the only one which receives two enabling pulses and therefore only switch $S_{10}$ is energized.

As previously described the sequential switches select positions to which the beam of light is directed. The output of each of the sequential light switches can be directed to one of 8 positions dependent upon the energization of switches $S_1$, $S_2$ and $S_3$. In this example, the $P_3$ bit being zero, an enabling pulse is provided for AND gate 248. The bits $P_1$ and $P_0$ being 10 provide an enabling pulse for AND gate 250 and pulse $P_1$ being zero provides an enabling pulse for AND gate 251. The output of these AND gates 248, 250 and 251 energize switches $S_1$, $S_2$ and $S_3$. This determines the exact position of the character on the printing medium.

When a subsequent character is received, the number in register 215 is increased by one count to 0110011 and this count is transferred through 236 to 237 at count 9. This does not change the selection of AND gate 244 and switch 10 but does change the selection of the switches $S_1$, $S_2$ and $S_3$. In this example $S_3$ would be energized but $S_1$ and $S_2$ would not be energized. This change in the status of switches $S_1$ and $S_2$ will change the position of the light beam to the next space on the line being printed.

*Operation of shift register 215*

Referring again to FIG. 15 shift register 215 receives shifting pulses from ten counter 194 through AND gate 216 which is normally enabled. Pulses 1 through 7 received from ten counter 194 cause the number in shift register 215 to be circulated through AND gates 218, 220 and 221 which are normally enabled and through the add 1 circuit 222 back to shift register 215. Thus, during the reception of the input data signal, the number in shift register 215 is increased by 1. This continues throughout the operation of the printer and causes the light beam to be positioned at adjacent points along the line of printing. When the count in shift register 215 reaches 79, that is, 80 positions have been printed, an output pulse is coupled through an inverter to AND gates 216 and 218. Thus, if a new data signal is received, the number in shift register 215 cannot be recirculated since AND gates 216 and 218 are not enabled. The inverted 79 pulse is also coupled to AND gate 224 which prevents pulse T2 from being applied to the sequential light switches, and thus the beam is not directed toward the printing medium. Register 215 will remain at position 79 and will ignore all subsequent pulses until it is reset as will be described.

*Control functions*

When a data signal is received which is a control function and not a character, as is indicated by bit $B_7$ being equal to bit $B_6$, the following operation takes place. In this example the control signals to be considered are line feed (LF), carriage return (CR), tab (TAB), and back space (BS). As was previously described, when the count in shift register 215 reaches 79 the shift register stops counting. The shifting pulses from ten counter 194 are blocked by disabled AND gate 216. If the function signal received is a CR or BS signal, an enabling signal is coupled from AND gate 227 or AND gate 228 to AND gate 216, enabling this gate. With this gate enabled shifting pulses from ten counter 194 can be received by shift register 215 and shift register 215 will recirculate its pulses. If the function signal received is BS, AND gate 231 is enabled and the signals are recirculated through subtractor 233, which subtracts one count from the number contained in shift register 215. If the function signal is CR, no path is provided for the number in register 215 to recirculate through. Thus, the number in shift register 215 will be shifted out and register 215 will contain the number 0000000, which is the number representing the starting position of the printing line. LF actuates the line feed solenoid to step the printing medium to provide a clear printing surface. BS, LF, and CR are the only signals which will be acted upon by shift register 215 once it has reached count position 79.

A TAB signal can also be provided which couples TAB memory 234 to shift register 215 to select a particular line position. It should be noted that the time required to change the position of the light beam along the line is constant and independent of the distance between the initial and final positions.

Thus, an electro-optical system for shaping and positioning a beam of plane polarized light has been described. By combining sequential and binary light switches and operating the binary light switches before the sequential light switches, positional switching transients have been substantially eliminated. The electro-optical system has also been shown in combination with other elements to form a high speed optical printer.

We claim:

1. An optical system for positioning a plane polarized light beam including in combination, a plurality of birefringent crystals positioned in the path of the light beam, a plurality of electro-optic crystals of the type causing rotation of the plane of polarization of plane polarized light passing therethrough in response to the application thereacross of an electric field of predetermined magnitude, one of said electro-optic crystals being positioned in the path of the light beam ahead of each of said birefringent crystals, and at least one optical prism positioned in the path of the light beam and adapted to reflect rays having one plane of polarization and to transmit rays having a different plane of polarization, one of said electro-optic crystals being positioned in the path of the light beam ahead of said prism, said electric field applied to said electro-optic crystal positioned ahead of said prism having a first magnitude whereby said light beam passes therethrough without rotation of the plane of polarization, and a second magnitude whereby said plane of polarization of the light beam is rotated 90°, said birefringent crystals and said prism being responsive to the plane of polarization of the light beam passing therethrough for selectively directing the light beam to predetermined positions.

2. An optical system for positioning a plane polarized light beam including in combination, a plurality of uniaxial birefringent crystals positioned in the path of the light beam and each having a different thickness, and at least one prism positioned in the path of the light beam and adapted to receive E and O rays and to reflect one of said rays and transmit the other of said rays, and a plurality of electro-optic crystals of the type which will cause rotation of the plane of polarization of plane polarized light passing therethrough when an electric field of predetermined magnitude is applied thereacross, one of said electro-optic crystals being positioned in the path of the light beam and ahead of each of said birefringent crystals and one of said electro-optic crystals being positioned ahead of said prism, said electric field applied to said electro-optic crystal positioned ahead of said prism having a first magnitude whereby said light beam passes therethrough without rotation of the plane of polarization, and a second magnitude whereby said plane of polarization of the light beam is rotated 90°, said birefringent crystals and said prism being responsive to the plane of polarization of the light beam passing therethrough whereby the light beam is directed to a predetermined position.

3. An optical system for directing a plane polarized light beam to a predetermined position upon a photosensitive medium including in combination, at least one birefringent crystal positioned in the path of the light beam, at least one prism adapted to reflect rays having one plane of polarization and to transmit rays having a different plane of polarization, and a plurality of electro-optic crystals of the type which will cause rotation of the plane of polarization of plane polarized light passing therethrough in response to the application thereacross of an electric field of predetermined magnitude, one of said electro-optic crystals being positioned in the path of the light beam ahead of said birefringent crystal and another of said electro-optic crystals being positioned in the path of the light beam ahead of said prism, said electric field applied to said electro-optic crystal positioned ahead of said prism having a first magnitude whereby said light beam passes therethrough without rotation of the plane of polarization and a second magnitude whereby said plane of polarization of the light beam is rotated 90°, said birefringent crystal and said prism being responsive to the plane of polarization of the light beam passing therethrough for selectively directing the light beam to predetermined positions on the photo sensitive medium.

4. An optical system for positioning a plane polarized light beam including in combination, a plurality of uniaxial birefringent crystals positioned in the path of the light beam, a plurality of Pockel's crystals positioned in the path of the light beam and each being ahead of one of said birefringent crystals, at least one Foster prism positioned in the path of the light beam, and a Pockel's crystal positioned in the path of the light beam ahead of said Foster prism, potential means coupled to each of said Pockel's crystals for selectively applying electric fields thereacross, each of said Pockel's crystals being responsive to an electric field thereacross of a first magnitude to transmit the light beam without rotation of the plane of polarization thereof and further being responsive to an electric field of a second magnitude to rotate the plane of polarization of the light beam 90°, said birefringent crystals and said Foster prism being responsive to the plane of polarization of the light beam passing therethrough whereby the light beam is directed to a predetermined position.

5. An optical system for positioning a plane polarized light beam including in combination, a plurality of birefringent crystals positioned in the path of the light beam, a plurality of electro-optic crystals of the type which will cause rotation of the plane of polarization of plane polarized light passing therethrough in response to the application thereacross of an electric field of predetermined magnitude, a first group of said electro-optic crystals being positioned in the path of the light beam with each crystal being directly ahead of one of said birefringent crystals, at least one prism positioned in the path of the light beam and adapted to receive E and O rays and to reflect one of said rays and to transmit the other of said rays, a further one of said electro-optic crystals being positioned in the path of the light beam ahead of said prism, first and second switching means coupled to said first group of electro-optic crystals and said further crystal respectively for applying said electric field to selected ones of said electro-optic crystals, said birefringent crystals and said prism being responsive to the plane of polarization of the light beam passing therethrough whereby the light beam is directed to a predetermined position, timing means coupled to said first and second switching means for controlling the same to cause said first switching means to apply said electric field to selected ones of said electro-optic crystals of said first group before said second switching means applies said electric field to said further electro-optic crystal and to cause said second switching means to remove said electric field from said further optic crystal before said first switching means removes said electric field from said selected one of said electro-optic crystal, whereby the optical system is substantially free of positional switching transients.

6. An optical system for positioning a plane polarized light beam including in combination, a plurality of uniaxial birefringent crystals, each having a different thickness, positioned in the path of the light beam, at least one Foster prism positioned in the path of the light beam, a plurality of Pockel's crystals positioned in the path of the light beam and each responsive to an electric field of predetermined magnitude to cause rotation of the plane of polarization of plane polarized light passing therethrough, said Pockel's crystals being individually positioned ahead of each of said birefringent crystals and ahead of said Foster prism, said birefringent crystals and said Foster prism being responsive to the plane of polarization of the light beam passing therethrough whereby the light beam is directed to a predetermined position, switching means coupled to said Pockel's crystals for selectively applying said electric field thereto, timing means coupled to said switching means for controlling the same to cause said switching means to apply said electric field to selected ones of said Pockel's crystals positioned ahead of said birefringent crystals before said switching means applies said electric field to said Pockel's crystal positioned ahead of said Foster prism and to cause said switching means to remove said electric field from said Pockel's crystal positioned ahead of said Foster prism before said switching means removes said electric field from said Pockel's crystals positioned ahead of said birefringent crystals, whereby the optical system is substantially free of positional switching transients.

7. An optical system for directing a plane polarized light beam to a predetermined position upon a photo-sensitive medium, including in combination, a plurality of uniaxial birefringent crystals positioned in the path of the light beam and each having a different thickness, at least one Foster prism positioned in the path of the light beam, a plurality of Pockel's crystals each responsive to an electric field thereacross to rotate the plane of polarization of plane polarized light passing therethrough, one of said Pockel's crystals being positioned in the path of the light beam and ahead of each of said birefringent crystals, and ahead of said prism, switching means coupled to said Pockel's crystals for selectively applying electric fields thereto, said birefringent crystals and said Foster prism being responsive to the plane of polarization of the light beam passing therethrough whereby the light beam is diretced to the predetermined position on the photo-sensitive medium, timing means coupled to said switching means for controlling the same to cause said switching means to apply said electric field to said selected Pockel's crystals positioned ahead of said birefringent crystals before said switching means applies said electric field to said Pockel's crystal ahead of said prism, and to cause said switching means to remove said electric field from said Pockel's crystal positioned ahead of said prism before said switching means removes said electric field from said Pockel's crystals positioned ahead of said birefringent crystals, whereby the optical system is substantially free of switching transients.

8. An optical system for directing a plane polarized light beam to a predetermined position upon a photo-sensitive medium, including in combination, a first birefringent crystal positioned in the path of the light beam, a first Pockel's crystal positioned in the path of the light beam ahead of said first birefringent crystal, and a second Pockel's crystal positioned in the path of the light after said first birefringent crystal, said first and second Pockel's crystals and said first birefringent crystal forming a first binary switch, a sequential light switch including a Foster prism and a third Pockel's crystal positioned ahead of said Foster prism, said sequential light switch being positioned in the path of the light beam after said first binary switch, a second binary switch including second and third birefringent crystals and fourth and fifth Pockel's crystals positioned ahead of said second and third birefringent crystals respectively, said second binary switch being positioned in the path of the light beam after said sequential light switch, first switching means coupled to said first, second, fourth and fifth Pockel's crystals, and second switching means coupled to said third Pockel's crystal for applying electric fields to selected ones of said Pockel's crystals, timing means coupled to said first and second switching means for controlling the same, said switching means being responsive to said timing means to cause said first switching means to apply said electric field to said selected Pockel's crystals before said second switching means applies said electric field to said third Pockel's crystal and to cause said second switching means to remove said electric field from said third Pockel's crystal before said first switching means removes said electric field from said selected Pockel's crystals, whereby the optical system is substantially free of switching transients, said first and second binary light switches and said sequential light switch acting to direct the light beam to a predetermined position on the photo-sensitive medium.

9. An optical system for shaping and directing a plane polarized light beam to a predetermined position on a photo-sensitive medium for imprinting a selected character thereon, including in combination, a first two-dimensional binary light switch having a first plurality of uniaxial birefringent crystals and first Pockel's crystals alternately positioned in the path of the light beam, a first portion of said plurality of birefringent crystals having their optical axes parallel and acting to displace the light beam to predetermined positions along a first axis, a second portion of said first plurality of birefringent crystals having their optical axes parallel and rotated 90° with respect to said optical axes of said first portion of birefringent crystals and acting to displace the light to predetermined positions along a second axis normal to said first axis, a second two-dimensional binary light switch having a second plurality of birefringent crystals and first Pockel's crystals alternately positioned in the path of the light beam, a third portion of said second plurality of birefringent crystals having their optical axes parallel and acting to displace the light beam to a given position along a third axis, a fourth portion of said second plurality of birefringent crystals having their optical axes parallel and rotated 90° with respect to said optical axes of said third portion of birefringent crystals and acting to displace the light beam to a given position along a fourth axis normal to said third axis, a character mask substantially opaque and having substantially transparent portions thereon positioned in the path of the light beam between said first and second two-dimensional binary switches, a third plurality of uniaxial birefringent crystals and first Pockel's crystals alternately positioned in said output path of the light beam, at least on Foster prism positioned in the path of the light beam, a second Pockel's crystal positioned in the path of the light beam ahead of each of said Foster prism, first and second switching means coupled to said first and second Pockel's crystals respectively for applying electric fields to selected ones of said first and second Pockel's crystals whereby the light beam is directed to a predetermined transparent portion of said mask for shaping thereby and to a predetermined position on the photo-sensitive medium, timing means coupled to said first and second switching means for controlling the same, said switching means being responsive to said timing means to cause said first switching means to apply said electric field to said selected first Pockel's crystals before said second switching means applies said electric field to said selected second Pockel' crystals and to cause said second switching means to remove said electric field from said selected second Pockel's crystals before said first switching means removes said electric field from said selected first Pockel's crystals, whereby the optical system is substantially free of positional switching transients.

10. An optical system for shaping and directing a plane polarized light beam to a predetermined position upon a photo-sensitive medium, including in combination, first and second two-dimensional binary light switches positioned in the path of the light beam, each of said switches having six birefringent crystal and six Pockel's crystals alternately positioned with each other, three of said birefringent crystals and three of said Pockel's crystals of each of said first and second switches forming a first group for directing the light beam to predetermined positions along a first axis, said birefringent crystals of asid first group having parallel optical axes and each having a different thickness, the remaining three of said birefringent crystals and three of said Pockel's crystals of each switch forming a second group for directing the light beam to predetermined positions along a second axis normal to said first axis, said birefringent crystals of said second group having optical axes rotated 90 degrees with respect to said optical axes of said first group of birefringent crystals, a character mask substantially opaque to light and having substantially transparent portions thereon positioned in the path of the light beam between said first and second two-dimensional binary switches, the plane polarized light beam being directed by said first two-dimensional binary switch to a particular one of said transparent portions of said mask and shaped thereby, said shaped plane polarized light beam being responsive to said second two-dimensional binary switch whereby the light beam is directed along a predetermined output path, a third binary light switch positioned in said output path and including a birefringent crystal and seventh and eighth Pockel's crystals positioned on opposite sides thereof, at least one Foster prism and a ninth Pockel's crystal positioned ahead of said Foster prism, said Foster prism positioned in the path of the light beam after said third binary switch, a fourth binary light switch including a pair of birefringent crystals and tenth and eleventh Pockel's crystals each positioned ahead of one of said birefringent crystals of said pair, said fourth binary switch being positioned in the path of the light beam after said Foster prism, first switching means coupled to said Pockel's crystals of said first, second, third and fourth binary light switches and second switching means coupled to said ninth Pockel's crystal for applying electric fields to selected ones of said Pockel's crystals, timing means coupled to said first and second switching means for controlling the same, to cause said first switching means to apply said electric field to said selected Pockel's crystals before said second switching means applies said electric field to said ninth Pockel's crystal and to cause said second switching means to remove said electric field from said ninth Pockel's crystal before said first switching means removes said electric field from said selected Pockel's crystals, whereby the optical system is substantially free of switching transients.

11. An optical printer for printing selected characters at predetermined positions on a photo-sensitive medium in response to data signals applied thereto, including in combination a source for providing a plane polarized light beam, coding means for receiving the data signals and converting the same to switching signals and first and second timing signals, a character mask having transparent portions thereon for shaping said light beam, character generation means for shaping said light beam and including first binary optical switching means coupled to said coding means, said first binary optical switching means being responsive to said switching signals and said first timing signals to direct said light beam to selected ones of said transparent portions of said character mask to shape said light beam, positioning means for directing said shaped light beam to a predetermined position on the photo-sensitive medium and including, second binary optical switching means and sequential optical switching means coupled to said coding means, said second binary optical switching means being responsive to said switching signals and said first timing signal and said sequential optical switching means being responsive to said switching signal and said second timing signal to direct said shaped light beam to the predetermined position on the photo-sensitive medium, mechanical means coupled to said photo-sensitive medium and said coding means and being responsive to said switching signals to position the photo-sensitive medium to receive the shaped light beam, said first timing signal occurring before said second timing signal for operating said binary optical switching means before operation of said sequential optical switching means so that positional switching transients are substantially eliminated.

12. An optical printer for printing selected characters at predetermined positions on a photo-conductive medium in response to data signals applied thereto, including in combination, a source for providing a plane polarized light beam, coding means for receiving the data signals and converting the same to switching signals and first and second timing signals, a character mask having transparent portions thereon for shaping said light beam, character generation means for shaping said light beam and including first binary optical switching means coupled to said coding means, said first binary optical switching means being responsive to said switching signals and said first timing signals to direct said light beam to selected ones of said transparent portions of said character mask to shape said light beam, positioning means for directing said shaped light beam to a predetermined position on the photo-conductive medium and including, second binary optical switching means and sequential optical switching means coupled to said coding means said second binary optical switching means being responsive to said switching signals and said first timing signal and said sequential optical switching means being responsive to said switching signals and said second timing signal to direct said shaped light beam to the predetermined position on the photo-conductive medium, charging means for placing an electric charge pattern on the photo-conductive medium before said light beam is positioned thereon, the photo-conductive medium being responsive to said shaped light beam to change said charge pattern where said shaped light beam strikes the photo-conductive medium, developing means for applying a visible toner to the photo-conductive medium in response to said charge pattern, fixing means for substantially permanently fixing said toner to the photo-conductive medium, mechanical means coupled to said photo-conductive medium and said coding means and being responsive to said switching signals to position the photo-conductive medium for alternately receiving said charge pattern, receiving said shaped light beam, receiving said toner, and having said toner fixed, said first timing signal occurring before said second timing signal for operating said binary optical switching means before operation of said sequential optical switching means so that positional switching transients are substantially eliminated.

References Cited by the Examiner
UNITED STATES PATENTS

| 3,106,881 | 10/1963 | Kapur | 95—4.5 |
| 3,182,574 | 5/1965 | Fleisher | 95—4.5 |
| 3,220,013 | 11/1965 | Harris | 346—107 |

JOHN M. HORAN, *Primary Examiner.*